US012809935B2

(12) United States Patent
Zhang et al.

(10) Patent No.: US 12,809,935 B2
(45) Date of Patent: Nov. 24, 2026

(54) MATRIX MULTIPLICATION CIRCUIT MODULE AND MATRIX MULTIPLICATION METHOD

(71) Applicant: Lemon Inc., Grand Cayman (KY)

(72) Inventors: Chuang Zhang, Los Angeles, CA (US); Shan Lu, Los Angeles, CA (US); Junmou Zhang, Los Angeles, CA (US); Yimin Chen, Los Angeles, CA (US); Jian Wang, Beijing (CN); Yuanlin Cheng, Beijing (CN)

(73) Assignee: Lemon Inc., Grand Cayman (KY)

( * ) Notice: Subject to any disclaimer, the term of this patent is extended or adjusted under 35 U.S.C. 154(b) by 1148 days.

(21) Appl. No.: 17/736,131

(22) Filed: May 4, 2022

(65) Prior Publication Data

US 2022/0358184 A1 Nov. 10, 2022

(30) Foreign Application Priority Data

May 7, 2021 (CN) ......................... 202110497293.9

(51) Int. Cl.
*G06F 17/16* (2006.01)
*G06G 7/161* (2006.01)
*G06N 3/063* (2023.01)

(52) U.S. Cl.
CPC ............. *G06F 17/16* (2013.01); *G06G 7/161* (2013.01); *G06N 3/063* (2013.01)

(58) Field of Classification Search
CPC ......... G06F 17/16; G06F 7/5443; G06G 7/16; G06G 7/161; G06N 3/063; G06N 3/065
See application file for complete search history.

(56) References Cited

U.S. PATENT DOCUMENTS 5,604,459 A * 2/1997 White .................... G06G 7/161 327/356
2005/0193050 A1 9/2005 Sazegari
(Continued)

FOREIGN PATENT DOCUMENTS

CN 103475224 A 12/2013
CN 108763163 A 11/2018
(Continued)

OTHER PUBLICATIONS

International Search Report and Written Opinion for International Application No. PCT/SG2022/050270, mailed Jul. 15, 2022, 17 Pages.

(Continued)

*Primary Examiner* — Carlo Waje

(57) ABSTRACT

A matrix multiplication circuit module and a matrix multiplication method are provided by the embodiments of the present disclosure. The circuit module includes one or more row-column calculation units for realizing row-column multiplication calculation. Each of the row-column calculation units comprises one or more multiplying units and an adding unit. Each of the one or more multiplying unit has an output end connected to an input end of the adding unit. Each of the multiplying units comprises an electrical signal regulating subunit and a load. The electrical signal regulating subunit is configured to regulate a magnitude of an input electrical signal. A multiplication operation is performed by the electrical signal regulating subunit and the load in response to an electrical signal inputted to the multiplying unit. The load has a fixed load value.

14 Claims, 4 Drawing Sheets

(56) References Cited

U.S. PATENT DOCUMENTS

| | | | | |
|---|---|---|---|---|
| 2017/0220526 | A1 | 8/2017 | Buchanan | |
| 2019/0108193 | A1 | 4/2019 | Buchanan | |
| 2019/0253039 | A1* | 8/2019 | Sicurella | H03K 5/24 |
| 2020/0142441 | A1 | 5/2020 | Bunandar et al. | |
| 2021/0064367 | A1 | 3/2021 | Kim et al. | |
| 2022/0027723 | A1* | 1/2022 | Kolter | G06N 3/08 |

FOREIGN PATENT DOCUMENTS

| | | | |
|---|---|---|---|
| CN | 112133351 | A | 12/2020 |
| CN | 112445456 | A | 3/2021 |
| CN | 112491281 | A | 3/2021 |
| JP | 2003-033012 | A | 1/2003 |
| JP | 2014-081701 | A | 5/2014 |
| JP | 2020-160887 | A | 10/2020 |
| KR | 10-2021-0028063 | A | 3/2021 |
| TW | 202001694 | A | 1/2020 |
| TW | 202215118 | A | 4/2022 |

OTHER PUBLICATIONS

Replaced Written Opinion for International Application No. PCT/SG2022/050270, mailed Jul. 15, 2022, 5 Pages.

Office action received for Chinese patent application No. 202110497293.9 mailed on Sep. 11, 2025, 29 pages (18 pages English Translation and 10 pages Original document).

Notice of Allowance received for Chinese patent application No. 202110497293.9 mailed on Jul. 10, 2026, 9 pages (5 pages English Translation and 4 pages Original document).

* cited by examiner

MATRIX MULTIPLICATION CIRCUIT MODULE AND MATRIX MULTIPLICATION METHOD

CROSS REFERENCE OF RELATED APPLICATION

The present application claims priority to Chinese Patent Application No. 202110497293.9, titled "MATRIX MULTIPLICATION CIRCUIT MODULE AND MATRIX MULTIPLICATION METHOD", filed on May 7, 2021 with the Chinese Patent Office, which is incorporated herein by reference in its entirety.

FIELD

The present disclosure relates to the technical field of neural network, and in particular to a matrix multiplication circuit module implemented by hardware, and a matrix multiplication method.

BACKGROUND

With the development of technology, a large amount of computational operations are required, including matrix multiplication.

The matrix multiplication may be implemented by a software program. To increase the computational speed, the matrix multiplication may be implemented by hardware.

SUMMARY

This summary is provided to introduce the idea in a simplified form. The idea will be described in detail in the following description. This summary is neither intended to identify key features or essential features of the claimed technical solution, nor intended to be used to limit the scope of the claimed technical solution.

A matrix multiplication circuit module and a matrix multiplication method are provided according to embodiments of the present disclosure.

In a first aspect, a matrix multiplication circuit module is provided according to embodiments of the present disclosure, which includes one or more row-column calculation units for realizing row-column multiplication calculation. Each of the row-column calculation units comprises one or more multiplying units and an adding unit. Each of the one or more multiplying unit has an output end connected to an input end of the adding unit. Each of the multiplying units comprises an electrical signal regulating subunit and a load. The electrical signal regulating subunit is configured to regulate a magnitude of an input electrical signal. A multiplication operation is performed by the electrical signal regulating subunit and the load in response to an electrical signal inputted to the multiplying unit. The load has a fixed load value.

In a second aspect, a matrix multiplication method is provided according to embodiments of the present disclosure, which is applied to the circuit module described in the first aspect. The method includes: obtaining a row matrix element of a row of a first matrix and a column matrix element of a column of a second matrix, wherein the column of the second matrix corresponds to the row of the first matrix, and the row matrix element is represented by an electrical signal; inputting the electrical signal representing the row matrix element to the row-column calculation unit, and regulating the electrical signal by the electrical signal regulating subunit based on a value of the column matrix element, wherein the row-column calculation unit comprises one or more multiplying unit and an adding unit, the multiplication unit comprises an electrical signal regulating subunit and a load; and determining a sum of response signals of all the multiplication units as a calculation result of the row-column calculation unit, wherein for each of the multiplication units, a response signal of the multiplication unit is obtained by applying an electric signal regulated by the electric signal regulating subunit of the multiplication unit to the load of the multiplying unit.

In a third aspect, an integrated circuit is provided according to embodiments of the present disclosure, which includes the matrix multiplication circuit module described in the first aspect.

BRIEF DESCRIPTION OF THE DRAWINGS

The above and other features, advantages and aspects of various embodiments of the present disclosure will become more clear when taken in conjunction with the accompanying drawings and with reference to the following detailed description. Throughout the drawings, the same or similar reference numbers refer to the same or similar elements. It should be understood that the drawings are schematic and that the units and elements are not necessarily drawn to scale.

DETAILED DESCRIPTION

Figure 1:
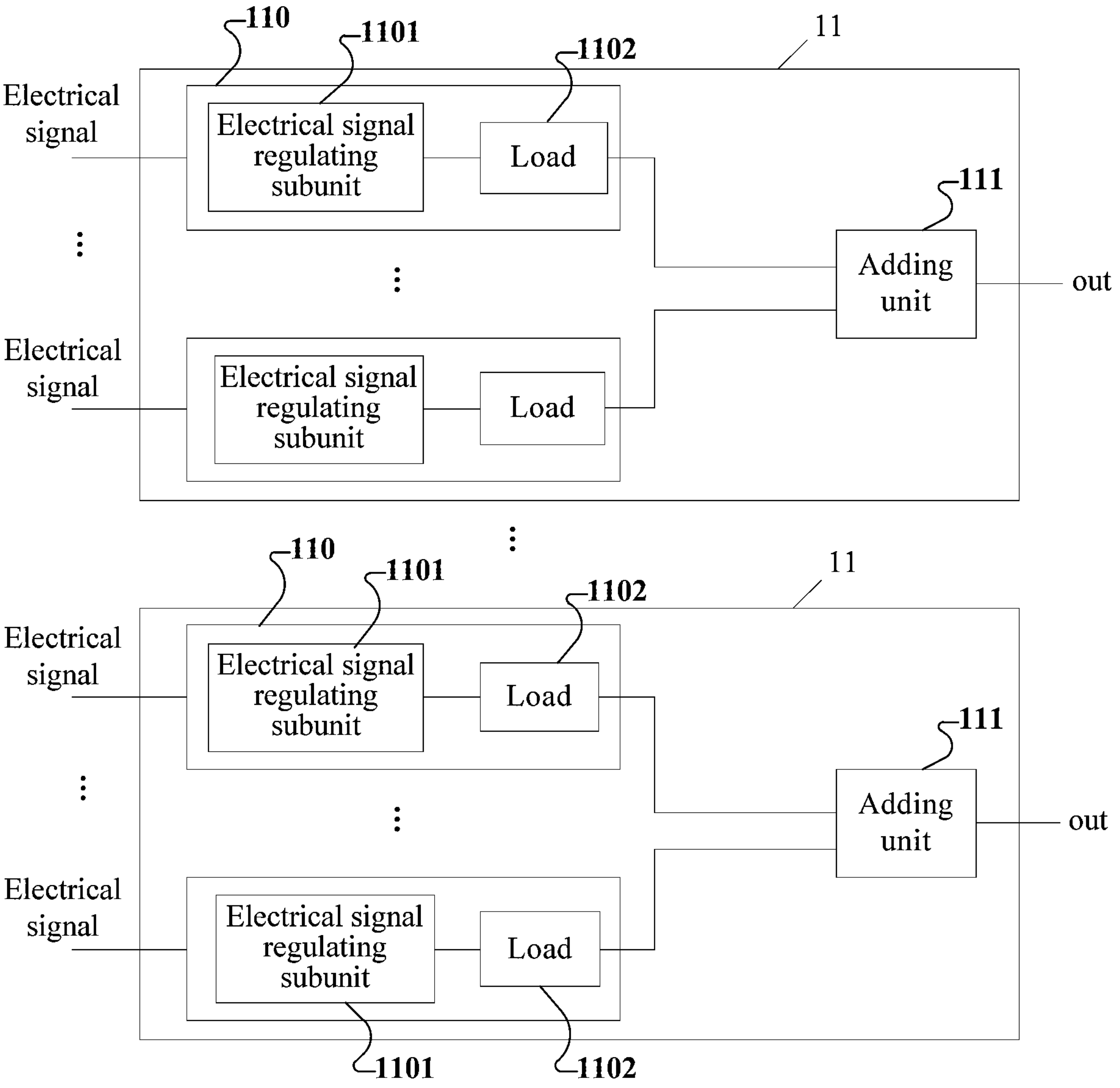
FIG. 1 is a schematic structural diagram of a matrix multiplication circuit module according to some embodiments in the present disclosure.

Embodiments of the present disclosure will be described in more detail below with reference to the accompanying drawings. While certain embodiments of the present disclosure are shown in the drawings, it should be understood that the present disclosure may be embodied in various forms and should not be construed as being limited to the embodiments set forth herein. The embodiments are provided for a more thorough and complete understanding. It should be understood that the drawings and embodiments of the present disclosure are only provided as examples, and are not intended to limit the protection scope of the present disclosure.

It should be understood that the various steps described in the method embodiments of the present disclosure may be performed in different orders and/or in parallel. Furthermore, method embodiments may include additional steps and/or omit an illustrated step. The scope of the present disclosure is not limited in this regard.

As used herein, the terms "including" and "comprising" and variations thereof are non-exclusive, i.e., meaning "including but not limited to". The term "based on" means "at least partially based on". The term "an embodiment" means "at least one embodiment", the term "another embodiment" means "at least one another embodiment", and the term "some embodiments" means "at least some embodiments". Relevant definitions of other terms will be given in the description below.

It should be noted that concepts such as "first" and "second" mentioned in the present disclosure are only used to distinguish different devices, modules or units, and are not used to limit the order or interdependence of functions performed by these devices, modules or units.

It should be noted that the modifications of "a" and "a plurality" mentioned in the present disclosure are illustrative rather than restrictive, and those skilled in the art should understand that unless clearly indicated otherwise, they should be understood as "one or more".

The names of messages or information exchanged between multiple devices in the embodiments of the present disclosure are only for illustrative purposes, and are not intended to limit the scope of these messages or information.

FIG. 1 is a schematic structural diagram of a matrix multiplication circuit module according to some embodiments in the present disclosure. As shown in FIG. 1, matrix multiplication circuit module includes at least one row-column calculation unit 11 for realizing row-column multiplication calculation.

The row-column calculation unit 11 includes at least one multiplying unit 110 and an adding unit 111. As shown in FIG. 1, the multiplying unit 110 includes an electrical signal regulating subunit 1101 and a load 1102. The electrical signal regulating subunit 1101 is configured to regulate a magnitude of an input electrical signal. The electrical signal regulating subunit 1101 and the load 1102 respond to the electrical signal inputted to the multiplying unit 110 to realize the multiplying operation.

An output of the at least one multiplying unit 110 is connected to an input of the adding unit 111.

The load value of the load 1102 is fixed. That is, the magnitude of the load value of the load 1102 cannot be regulated.

In this embodiment, the electrical signals inputted to a same row-column calculation units 11 may be different from each other.

In some application scenarios, the above-mentioned matrix multiplication realizes the multiplication of the feature matrix outputted by neurons in a neural network and a weight matrix, and the above-mentioned electrical signals may represent the matrix elements in the feature matrix outputted by the neurons. Different electrical signals in the same row-column calculation unit may represent different matrix elements in the feature matrix. The above feature matrix can be represented as an electrical signal matrix.

The above-mentioned electrical signal regulating unit may regulate the magnitude of the electrical signal. Taking a voltage signal as an example, the electrical signal regulating unit can regulate the magnitude of the voltage signal inputted to the row-column calculation unit.

In some optional embodiments, the electrical signal is a voltage signal, or a current signal. The present disclosure is provided by using an example that the electrical signal is a voltage signal. The above-mentioned electrical signal regulating unit may include a voltage signal duty cycle regulating unit.

In some optional embodiments, the above-mentioned electrical signal may be a pulse signal. The period of the pulse signal may be T. The duty cycle of the pulse signal is regulated by regulating the duration of an effective working level (e.g., a high level) in the pulse signal in the period T. In this example, the regulating of the magnitude of the voltage signal is achieved by regulating the duty cycle of the pulse signal.

In the present disclosure, the electrical signal regulating subunit and the load are used to implement the weight in the above-mentioned matrix multiplication. While keeping the parameter of the load unchanged, the electric signal regulating subunit regulates the duty cycle of the electric signal according to the change of the weight. The response signal obtained by applying the regulated electrical signal to the load is the same as the response signal obtained by regulating the load value of the load according to the weight. That is, the weight value is changed by regulating the duty cycle of the electrical signal according to the weight value and applying the regulated electrical signal to the load.

In the related art, in order to realize the multiplication of the feature matrix outputted by the neurons and the weight matrix, a load with an adjustable load value (such as a resistor) is used to realize the weight in the weight matrix. For different weights, the load is regulated to different load values. For each row-column calculation unit, in order to regulate the load values of the loads in the row-column calculation unit, it is necessary to arrange multiple loads with fixed load values, connect these loads according to a preset connection method, and use logic circuits, switch circuits and other circuits to control the load values of the loads. Therefore, this circuit that realizes different weights by regulating the load values has a complicated structure.

The matrix multiplication circuit module provided in this embodiment uses a load with a fixed load value and regulate the magnitude of the electrical signal by regulating the duty cycle of the electrical signal according to the matrix elements (weights) in the weight matrix. By applying the regulated electric signal to the load, the effect of multiplying the weight value and the electric signal can be realized, which is convenient to adapt to the change of the weight value. Therefore, the structure of the circuit module for realizing matrix multiplication is simplified, and the complexity of the matrix multiplication circuit module for realizing matrix multiplication is reduced.

In an embodiment, the duty cycle of the voltage signal may be regulated through the electronically controlled pulse width modulation (pulse width modulation, PWM) technique.

In the electronically controlled pulse width modulation technique, a phase locked loop based phase interposer (PLL based phase interposer) may be used to generate the control signal. The control signal is applied to the switch circuit, to control the switch circuit to be switched on or off, so as to realize the regulation of the duty cycle of the electrical signal.

Figure 2:
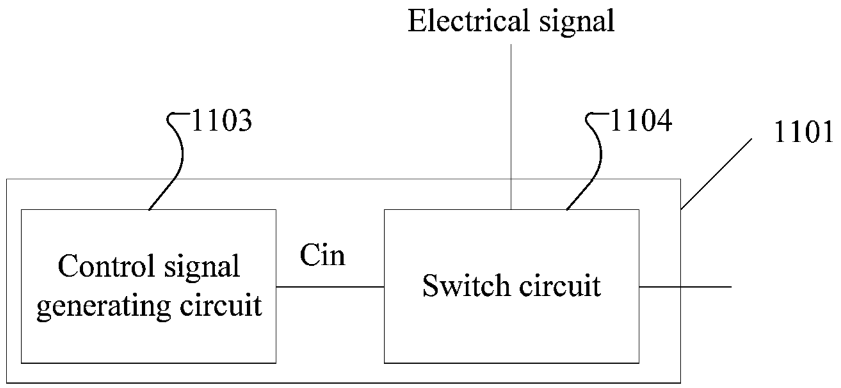
FIG. 2 is a structural schematic diagram of an electrical signal regulating subunit in the example as shown in FIG. 1.

FIG. 2 is a schematic structural diagram of an electrical signal regulating subunit in the matrix multiplication circuit module as shown in FIG. 1. As shown in FIG. 2, the electrical signal regulating subunit 1101 (voltage signal duty cycle regulating unit) includes a control signal generating circuit 1103 and a switch circuit 1104. The control signal generating circuit 1103 may include a phase-locked loop based phase inserter. The switch circuit 1104 may include various switching devices. The switching devices include triodes, field effect transistors, insulated gate bipolar transistors, or other devices that realize switching functions. The control signal generated by the control signal generating circuit controls the duty cycle of the voltage signal by controlling the switch circuit to be switched on or off.

The control signal generating circuit can regulate the duration of the effective working signal of the control signal in the period T1 of the control signal according to the change of the value of a matrix element in the weight matrix. The effective working signal can switch the switching device on, so that the electrical signal is applied to the load. During the inactive working signal in the period T1, the switching device is switched off, so that the electrical signal is not applied to the load. For example, when the control signal is at a high level, the switch circuit is switched on, and when the control signal is at a low level, the switch circuit is switched off. The duration that the switch circuit is switched on is positively related to the duty cycle of the control signal. In this way, the duty cycle of the electrical signal applied to the load is regulated, thereby regulating the magnitude of the electrical signal.

Taking the amplitude of the electrical signal being 12V as an example, when the duty cycle is 1, the electrical signal applied the above-mentioned load is 12V. The duty cycle of the electrical signal applied to the load can be controlled to ½ by the control signal, so that the electrical signal applied to the load is 6V.

Further, the same control signal generating circuit 1103 (e.g., the PLL based phase interposer) can be used to generate the control signals Cin corresponding to multiple row-column calculation units. The multiple control signals generated by the same PLL based phase interposer can be respectively inputted to the corresponding row-column calculation units through a multiplexer. The input terminal of the switch circuit in the row-column calculation unit is inputted with the electrical signal outputted by the multiplexer, and the output terminal of the switch circuit is connected to the load. After the electrical signal regulating subunit outputs the control signal Cin of the preset duty ratio through the multiplexer, the switch circuit is switched on or off under the action of the pulse signal.

Using the same control signal generating circuit 1103 to generate the control signals Cin corresponding to the multiple row-column calculation units can further simplify the structure of the circuit module for realizing matrix multiplication.

In some optional implementations, the one or more multiplication units 110 included in the same row-column calculation unit 11 have the loads 1102 with the same parameter. The multiplication units use the loads of the same parameter, which means that the parameter values of the loads in the multiplication units are the same. For example, if the loads are resistors, the resistance values (or conductance values) of the resistors in the row-column calculation unit are the same.

In these optional implementations, multiplication units of the row-column calculation unit may include the loads 1102 with the same parameter. The weights corresponding to each multiplication unit of the row-column calculation unit may be jointly realized by the electrical signal regulating subunit and the load of the multiplication unit.

In these optional implementations, since the same load is used in the same row-column calculation unit, the process of manufacturing the load can be simplified compared to the method of fabricating different loads in a same row-column calculation unit, thereby reducing complexity of the structure and the manufacturing process of the circuit module for realizing matrix multiplication.

Further, for one or more row-column calculation unit that implements the row-column multiplication calculation, the multiplication units in the row-column calculation units may have loads with the same parameter. The row-column calculation units use the loads of the same parameter, which means that the parameter values of the loads used by the row-column calculation units are the same. For example, if the loads are resistors, the resistance values (or conductance values) of the resistors used by the row-column calculation units are the same. The process of manufacturing the load can be further simplified, thereby further reducing the complexity of the manufacturing process of the circuit module for realizing matrix multiplication.

Figure 3:
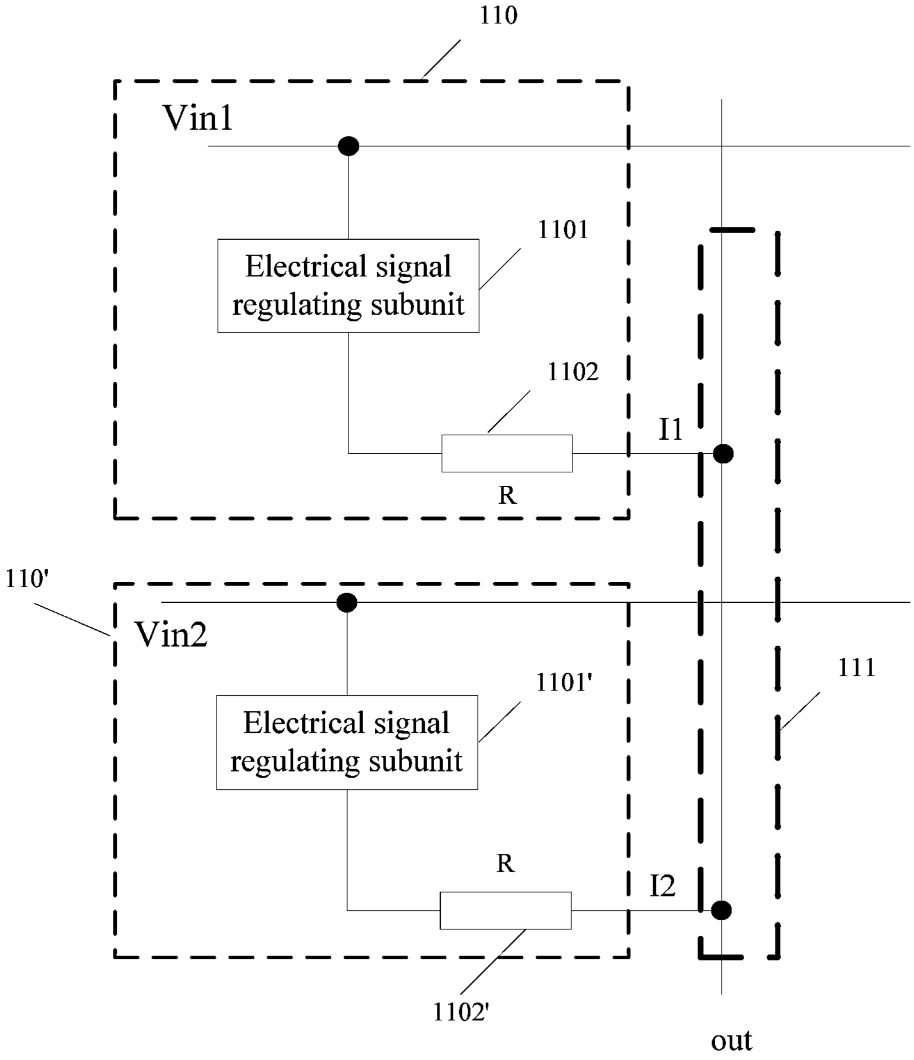
FIG. 3 is a schematic structural diagram of a row-column calculation unit in the circuit module as shown in FIG. 1.

In some application scenarios, FIG. 3 shows a circuit structure diagram of a row-column calculation unit according to an embodiment. As shown in FIG. 3, the loads in this row-column calculation unit are resistors. The electrical signals are voltage signals. The resistance values in the multiplication units are equal to each other, which is denoted as R.

In the row-column calculation unit shown in FIG. 3, a row of the electrical signal matrix includes two matrix elements Vin1 and Vin2. A column of the weight matrix includes two matrix elements D11*(1/R) and D21*(1/R). D11 is the voltage signal regulation ratio realized by the duty cycle of the voltage signal Vin1 regulated by the electrical signal regulating subunit 1101. D12 is the voltage signal regulation ratio realized by the duty cycle of the voltage signal Vin2 regulated by the electrical signal regulating subunit 1101'.

For the input signal Vin1, through the multiplication unit 110, the resistor 1102 (R) responds to the input Vin1, and the response signal outputted by the resistor 1102 is the current signal I1:

$$I1 = Vin1 \times D11 \times \frac{1}{R}. \tag{1}$$

For the input signal Vin2, through the multiplication unit 110', the resistor 1102' (R) responds to the input Vin2, and the response signal outputted by the resistor 1102' is the current signal I2:

$$I2 = Vin2 \times D12 \times \frac{1}{R}. \tag{2}$$

The above adding unit 111 is realized by connecting the multiplying unit 110 and the multiplying unit 110' in parallel. The multiplying unit 110 and the multiplying unit 110' are connected in parallel so that the output "out" of the row-column calculation unit is the sum of the current signal I1 and current signal I2. That is:

$$\text{out} = I1 + I2 = Vin1 \times D11 \times \frac{1}{R} + Vin2 \times D12 \times \frac{1}{R}. \tag{3}$$

The row-column calculation unit shown in FIG. 3 has the loads of the fixed load value and regulates duty cycle of the input voltage signal by the electrical signal regulating subunit to regulate the magnitude of the electrical signal applied to the load according to the change of the weight. The multiplication operation of the matrix can be realized by multiple row-column calculation units. The circuit module for realizing matrix multiplication formed by the row-column calculation units has a relatively low structural complexity.

Figure 4:
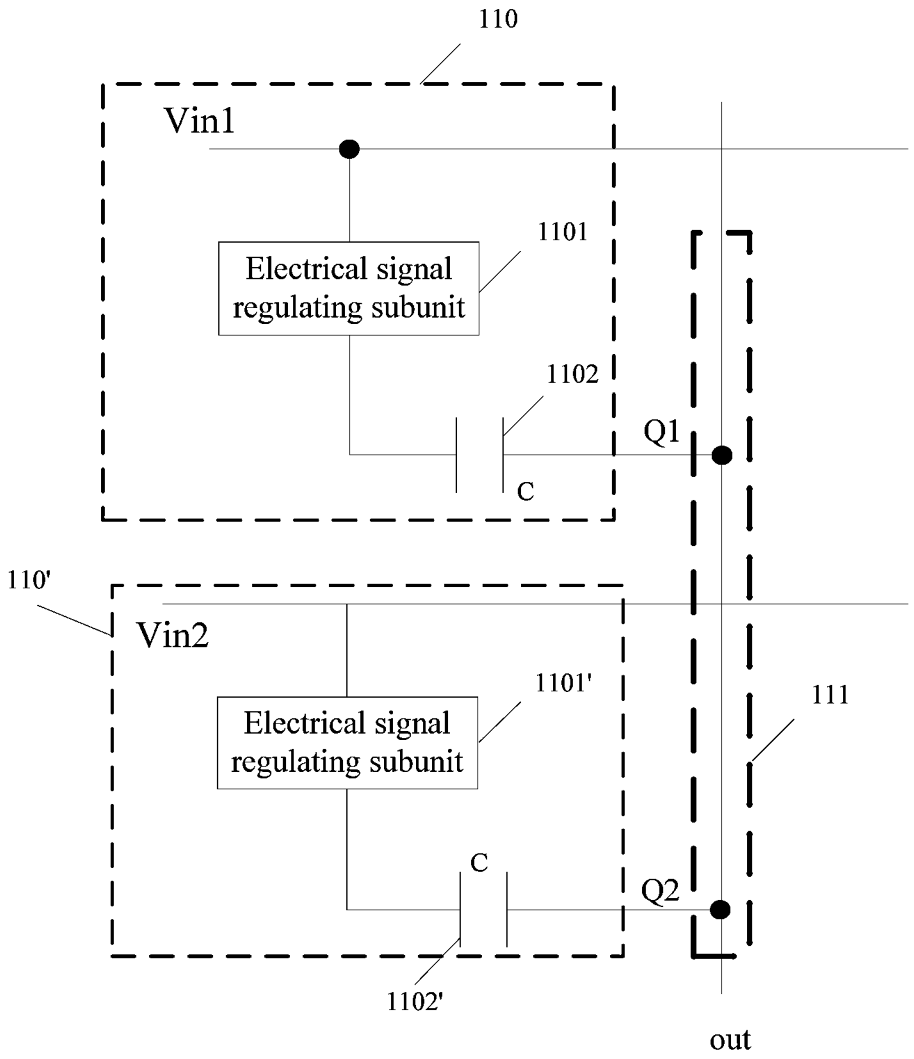
FIG. 4 is another schematic structural diagram of a row-column calculation unit in the circuit module as shown in FIG. 1.

FIG. 4 shows a circuit structure diagram of another implementation of the row-column calculation unit. As shown in FIG. 4, the loads in the row-column calculation units are capacitors. The electrical signal is a voltage signal. The capacitance values of the multiplication units are equal to each other, which is denoted as C.

A row of the above electrical signal matrix includes two matrix elements Vin1 and Vin2. A column of the above weight matrix includes two matrix elements D11*C and D21*C. Here, D11 is a voltage signal regulation ratio realized by the duty cycle of the voltage signal Vin1 regulated by the electrical signal regulating subunit 1101, and D12 is the voltage signal regulation ratio realized by the duty cycle of the voltage signal Vin2 regulated by the electrical signal regulating subunit 1101'.

For the input signal Vin1, through the multiplying unit 110, the capacitor 1102 (C) responds to the input Vin1, and the response signal outputted by the capacitor 1102 is the charge signal Q1:

$$Q1 = Vin1 \times D11 \times C. \tag{4}$$

For the input signal Vin2, through the multiplication unit 110', the capacitor 1102' (R) responds to the input Vin2, and the response signal outputted by the resistor 1102' is the charge signal Q2:

$$Q2 = Vin2 \times D12 \times C. \tag{5}$$

The above adding unit 111 is realized by connecting the multiplying unit 110 and the multiplying unit 110' in parallel. The multiplying unit 110 and the multiplying unit 110' are connected in parallel so that the output "out" of the row-column calculation unit is the sum of the above-mentioned charge signal Q1 and charge signal Q2. That is:

$$\text{out} = Q1 + Q2 = Vin1 \times D11 \times C + Vin2 \times D12 \times C. \tag{6}$$

The row-column calculation unit shown in FIG. 4 has the loads of the fixed load value and regulates duty cycle of the input voltage signal by the electrical signal regulating subunit to regulate the magnitude of the electrical signal applied to the load according to the change of the weight. The multiplication operation of the matrix can be realized by multiple row-column calculation units. The circuit module for realizing matrix multiplication formed by the row-column calculation units has a relatively low structural complexity.

An integrated circuit is provided according to some embodiments of the present disclosure. The integrated circuit includes the matrix multiplication circuit module in the above embodiments as shown in FIG. 1 to FIG. 4. The integrated circuit may be an integrated circuit that implements various functions.

Figure 5:
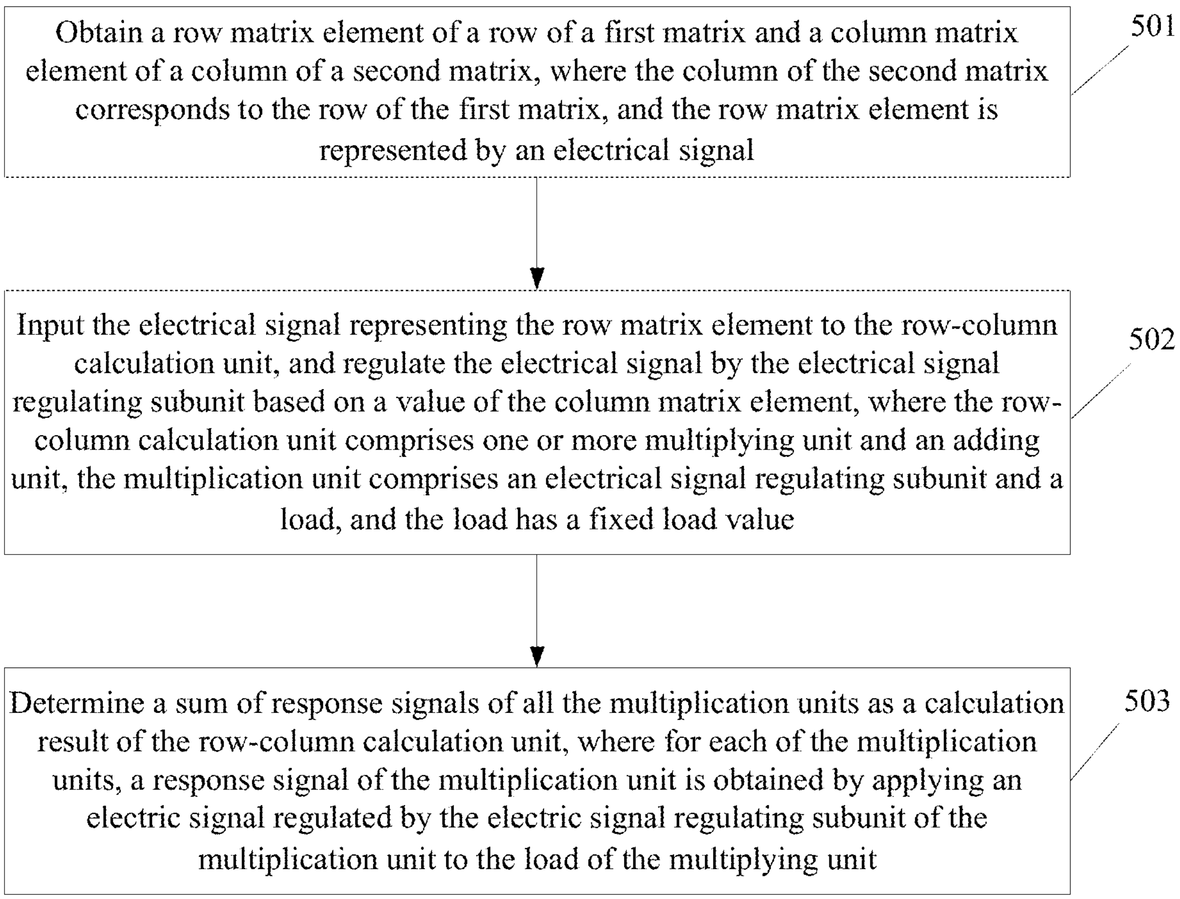
FIG. 5 is a flowchart of a matrix multiplication method according to some embodiments in the present disclosure.

FIG. 5 shows a schematic flowchart a matrix multiplication method according to some embodiments of the present disclosure. The matrix multiplication method is applied to the matrix multiplication circuit module as shown in FIG. 1.

As shown in FIG. 5, the matrix multiplication method includes the following steps 501 to 503.

In step 501, a row matrix element of a row of a first matrix and a column matrix element of a column of a second matrix are obtained, where the column of the second matrix corresponds to the row of the first matrix, and the row matrix element is represented by an electrical signal.

The matrix multiplication includes performing a row-column multiplication calculation on each row matrix element of the first matrix and a corresponding column matrix element in the second matrix. In this embodiment, the realization of matrix multiplication is described by taking the realization of row-column multiplication as an example.

The first matrix here may include n*m matrix elements. That is, it includes n rows and m columns of matrix elements, where n and m are integers greater than or equal to 1.

The second matrix may include m*p matrix elements, that is, it includes m rows and p columns of matrix elements, where m and p are integers greater than or equal to 1.

The matrix elements in the first matrix may be represented by electrical signals. That is, the magnitude of the electrical signal may be used to represent the values of the matrix elements. The electrical signal here may be a voltage signal or a current signal. An example that the electrical signal is a voltage signal is used for description.

In some application scenarios, the above-mentioned first matrix is a feature matrix outputted by neurons of a neural network. In these application scenarios, a matrix element in the first matrix can be regarded as a feature value outputted by a neuron. The second matrix may be a weight matrix. The weights in the weight matrix correspond to the feature values in the one-to-one correspondence.

In step 502, the electrical signal corresponding to the row matrix element is inputted to the row-column calculation unit, and the electrical signal regulating subunit is used to regulate the electrical signal based on a value of a column matrix element. The row-column calculation unit includes at least one multiplication unit and an adding unit. The multiplication unit includes an electrical signal regulating subunit and a load, and a load value of the load is fixed.

The number of multiplication units included in the row-column calculation unit may match the number of matrix elements included in a row of the first matrix.

The above multiplication unit is configured to realize the multiplication of a row matrix element in a row in the first matrix and a column matrix element in a corresponding column of second matrix.

In this embodiment, the load value of the load is fixed.

The load may be a resistor or a capacitor.

The electrical signal includes a voltage signal, and the electrical signal regulating subunit includes a voltage signal duty ratio regulating unit. The voltage signal duty ratio regulating unit includes a control signal generating circuit and a switch circuit. The above step 502 includes the following substeps.

First, a control signal matching the value of the column matrix element is generated by the control signal generating circuit.

Then, the control signal is applied to the switch circuit to control the switch circuit to be switched on or off, to regulate the magnitude of the voltage signal applied to the load to match the column matrix element. For a specific description, reference may be made to the description of the electrical signal regulating subunit shown in FIG. 2, which will not be repeated here.

For each multiplication unit implementing the multiplication of a row matrix element and a column matrix element, the electrical signal regulating subunit may be used to regulate the magnitude of the electrical signal representing the row matrix element according to the value of the column matrix element. The function of the regulation ratio of the electrical signal in combination with the load matches the value of the column matrix element.

For a neural network, a same neural network unit may correspond to multiple matrix multiplications. The matrix elements in the weight matrix corresponding to different matrix multiplications may be different from each other. In order to adapt to the situation that weights corresponding to multiple matrix multiplications are different, the matrix multiplication circuit module for implementing matrix multiplication provided by the present disclosure and the matrix multiplication method provided in this embodiment can be used to complete matrix multiplication. By regulating the input electrical signal, the complexity of the circuit structure for realizing matrix multiplication can be reduced.

In step 503, the sum of the response signals of the multiplication units is used as the calculation result obtained by the row-column calculation unit. The response signal of the multiplication unit is obtained by applying the electrical signal regulated by the electrical signal regulating subunit of the multiplication unit to the load of the multiplication unit.

If the above load is a resistor, the response signal outputted by the multiplication unit is a current signal. If the load is a capacitor, the response signal outputted by the multiplication unit is a charge signal.

With the matrix multiplication circuit module and the matrix multiplication method provided by the embodiments of the present disclosure, by using a load with a fixed load value and regulating the electrical signal by the electrical signal regulating subunit of the multiplication unit, the column matrix element is achieved by the regulation ratio and the load. By applying the regulated electric signal to the load, the effect of multiplying electrical signal representing the row matrix element and the corresponding column matrix element can be realized, which is convenient to adapt to the change of the column matrix element. Therefore, the structure of the circuit module for realizing matrix multiplication is simplified, and the complexity of the circuit module is reduced.

The above merely describes preferred embodiments of the present disclosure and illustrates the technical principles. Those skilled in the art should understand that the scope of the disclosure is not limited to the technical solutions formed by the specific combination of the technical features, and should also cover, without departing from the above disclosed concept, the technical solutions formed by any combination of the technical features or other equivalent features. For example, a technical solution may be formed by replacing a feature with another feature having similar function disclosed in the present disclosure (but not limited to).

Additionally, although operations are illustrated in a particular order, this should not be construed as requiring the operations to be performed in the particular shown order. Under certain circumstances, multitasking and parallel processing may be advantageous. Similarly, although the above discussion contains several specific details, these should not be construed as limitations on the scope of the present disclosure. Certain features that are described in the context of separate embodiments can also be combined into a same embodiment. Conversely, various features that are described in the context of a same embodiment can also be implemented in multiple embodiments separately or in any suitable subcombination.

Although the subject matter has been described in language specific to structural features and/or logical method steps, it is to be understood that the subject matter defined in the appended claims is not necessarily limited to the specific features or steps described above. Rather, the specific features and steps described above are merely examples of implementing the claims.

The invention claimed is:

1. A matrix multiplication circuit module, comprising:

one or more row-column calculation units for realizing row-column multiplication calculation, wherein each of the one or more row-column calculation units comprises one or more multiplying units and an adding unit, each of the one or more multiplying units has an output end connected to an input end of the adding unit;

each of the one or more multiplying units comprises an electrical signal regulating subunit and a load, wherein the electrical signal regulating subunit is configured to regulate a magnitude of an input electrical signal, a multiplication operation is performed by the electrical signal regulating subunit and the load in response to an electrical signal inputted to the multiplying unit; and the load has a fixed load value;

wherein loads in the one or more multiplying units in a same row-column calculation unit have a same parameter;

wherein the electrical signal comprises a voltage signal, and the electrical signal regulating subunit comprises a voltage signal duty cycle regulating unit;

wherein the voltage signal duty cycle regulating unit comprises a control signal generating circuit and a switch circuit, and the control signal generating circuit is configured to generate a control signal to switch on or off the switch circuit to control a duty cycle of the voltage signal, wherein a number of different duty cycles and the loads with the same parameters together implement a number of different weights, the same as of the number of different duty cycles, in a matrix multiplication, and the number is at least three.

2. The circuit module according to claim 1, wherein loads in the one or more multiplying units in the one or more row-column calculation units have a same parameter.

3. The circuit module of claim 1, wherein the load comprises a resistor or a capacitor.

4. The circuit module of claim 1, wherein the electrical signal is a voltage signal, the load is a resistor, and the adding unit of each of the one or more row-column calculation units is configured to sum current signals outputted by the one or more multiplying units.

5. The circuit module of claim 1, wherein the electrical signal is a voltage signal, the load is a capacitor, and the adding unit of each of the one or more row-column calculation units is configured to sum charge signals outputted by the one or more multiplying units.

6. The circuit module according to claim 1, wherein the matrix multiplication circuit module is used for implementing convolution calculation on a weight matrix and a feature matrix outputted by neurons of a neural network.

7. A matrix multiplication method, applied to a matrix multiplication circuit module, comprising:

obtaining a row matrix element of a row of a first matrix and a column matrix element of a column of a second matrix, wherein the column of the second matrix corresponds to the row of the first matrix, and the row matrix element is represented by an electrical signal;

inputting the electrical signal representing the row matrix element to a row-column calculation unit, and regulating the electrical signal by a electrical signal regulating subunit based on a value of the column matrix element, wherein the row-column calculation unit comprises an one or more multiplying units and an adding unit, the one or more multiplying units comprises an electrical signal regulating subunit and a load; and determining a sum of response signals of all the multiplying units as a calculation result of the row-column calculation unit, wherein for each of the one or more multiplying units, a response signal of the one or more multiplying units is obtained by applying the electrical signal regulated by the electrical signal regulating subunit of the one or more multiplying units to the load of the one or more multiplying units;

wherein loads in the one or more multiplying units in a same row-column calculation unit have a same parameter;

wherein the electrical signal comprises a voltage signal, and the electrical signal regulating subunit comprises a voltage signal duty cycle regulating unit;

wherein the voltage signal duty cycle regulating unit comprises a control signal generating circuit and a switch circuit, and the control signal generating circuit is configured to generate a control signal to switch on or off the switch circuit to control a duty cycle of the voltage signal, wherein a number of different duty cycles and the loads with the same parameters together implement a number of different column matrix element, the same as of the number of duty cycles, in a matrix multiplication, and the number is at least three.

8. The method according to claim 7, wherein the inputting the electrical signal representing the row matrix element to the row-column calculation unit, and regulating the electrical signal by the electrical signal regulating subunit based on the value of the column matrix element comprises:

generating, by the control signal generating circuit, a control signal matching the value of the column matrix element; and applying the control signal to the switch circuit, to switch on or off the switch circuit to regulate a magnitude of the voltage signal applied on the load to be matched with the column matrix element.

9. The method according to claim 7, wherein the first matrix is a feature matrix outputted by neurons of a neural network, and the second matrix is a weight matrix.

10. An integrated circuit, comprising one or more matrix multiplication circuit modules, wherein a matrix multiplication circuit module, comprising:

one or more row-column calculation units for realizing row-column multiplication calculation, wherein each of the one or more row-column calculation units comprises one or more multiplying units and an adding unit, each of the one or more multiplying units has an output end connected to an input end of the adding unit;

each of the one or more multiplying units comprises an electrical signal regulating subunit and a load, wherein the electrical signal regulating subunit is configured to regulate a magnitude of an input electrical signal, a multiplication operation is performed by the electrical signal regulating subunit and the load in response to an electrical signal inputted to the multiplying unit; and the load has a fixed load value;

wherein loads in the one or more multiplying units in a same row-column calculation unit have a same parameter;

wherein the electrical signal comprises a voltage signal, and the electrical signal regulating subunit comprises a voltage signal duty cycle regulating unit;

wherein the voltage signal duty cycle regulating unit comprises a control signal generating circuit and a switch circuit, and the control signal generating circuit is configured to generate a control signal to switch on or off the switch circuit to control a duty cycle of the voltage signal, wherein a number of different duty cycles and the loads with the same parameters together implement a number of different weights, the same as of the number of different duty cycles, in a matrix multiplication, and the number is at least three.

11. The integrated circuit according to claim 10, wherein loads in the one or more multiplying units in the one or more row-column calculation units have a same parameter.

12. The integrated circuit according to claim 10, wherein the load comprises a resistor or a capacitor.

13. The integrated circuit of claim 10, wherein the electrical signal is a voltage signal, the load is a resistor, and the adding unit of each of the one or more row-column calculation units is configured to sum current signals outputted by the one or more multiplying units.

14. The integrated circuit of claim 10, wherein the electrical signal is a voltage signal, the load is a capacitor, and the adding unit of each of the one or more row-column calculation units is configured to sum charge signals outputted by the one or more multiplying units.

* * * * *